US008219998B2

(12) United States Patent
Taylor et al.

(10) Patent No.: US 8,219,998 B2
(45) Date of Patent: *Jul. 10, 2012

(54) METHOD AND SYSTEM FOR LOAD BALANCING OF COMPUTING RESOURCES

(75) Inventors: Neil Allen Taylor, Cedar Park, TX (US); Adam R. Holley, Austin, TX (US); Vijay K. Aggarwal, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 908 days.

This patent is subject to a terminal disclaimer.

(21) Appl. No.: 12/152,988

(22) Filed: May 19, 2008

(65) Prior Publication Data

US 2008/0222647 A1    Sep. 11, 2008

Related U.S. Application Data

(62) Division of application No. 11/242,678, filed on Oct. 3, 2005, now Pat. No. 7,934,216.

(51) Int. Cl.
*G06F 9/46* (2006.01)
*G06F 15/173* (2006.01)

(52) U.S. Cl. .................. 718/105; 718/104; 709/226

(58) Field of Classification Search ................. None
See application file for complete search history.

(56) References Cited

U.S. PATENT DOCUMENTS

| | | | | |
|---|---|---|---|---|
| 6,078,959 A * | 6/2000 | Wright et al. | ................. | 709/227 |
| 6,665,702 B1 * | 12/2003 | Zisapel et al. | ................. | 718/105 |
| 6,725,253 B1 * | 4/2004 | Okano et al. | .................. | 709/203 |
| 6,842,901 B1 * | 1/2005 | Miller | ........................... | 718/104 |
| 6,871,346 B1 * | 3/2005 | Kumbalimutt et al. | ....... | 718/104 |
| 6,986,140 B2 * | 1/2006 | Brenner et al. | .............. | 718/105 |
| 7,143,169 B1 * | 11/2006 | Champagne et al. | ......... | 709/226 |
| 7,203,943 B2 * | 4/2007 | Shaffer | ........................ | 718/104 |
| 7,281,045 B2 * | 10/2007 | Aggarwal et al. | ............ | 709/226 |
| 7,409,706 B1 * | 8/2008 | O'Rourke et al. | .............. | 726/11 |
| 7,437,461 B2 * | 10/2008 | Sugizaki | ....................... | 709/226 |
| 7,475,285 B2 * | 1/2009 | Wang et al. | ...................... | 714/13 |
| 7,500,243 B2 * | 3/2009 | Huetsch et al. | ............... | 718/105 |
| 7,519,964 B1 * | 4/2009 | Islam et al. | ................... | 717/177 |
| 7,523,454 B2 * | 4/2009 | Romero et al. | .............. | 718/105 |
| 7,561,161 B2 * | 7/2009 | Minadakis | ..................... | 345/501 |
| 7,886,299 B2 * | 2/2011 | Kitamura | ...................... | 718/104 |
| 7,921,424 B2 * | 4/2011 | Shutt et al. | .................... | 718/105 |
| 2003/0149756 A1 * | 8/2003 | Grieve et al. | .................. | 709/223 |
| 2004/0128553 A1 * | 7/2004 | Buer et al. | ..................... | 713/201 |

(Continued)

*Primary Examiner* — Emerson Puente
*Assistant Examiner* — Adam Lee
(74) *Attorney, Agent, or Firm* — Jeffrey LaBaw; Darcell Walker

(57) ABSTRACT

A load balancing method incorporates temporarily inactive machines as part of the resources capable of executing tasks during heavy process requests periods to alleviate some of the processing load on other computing resources. This method determines which computing resources are available and prioritizes these resources for access by the load balancing process. A snap shot of the resource configuration and made secured along with all data on this system such that no contamination occurs between resident data on that machine and any data placed on that machine as put of the load balancing activities. After a predetermined period of time or a predetermined event, the availability of the temporary resources for load balancing activities ends. At this point, the original configuration and data is restored to the computing resource such that no trace of use of the resource in load balancing activities is detected to the user.

16 Claims, 5 Drawing Sheets

U.S. PATENT DOCUMENTS

| | | | |
|---|---|---|---|
| 2004/0205759 A1* | 10/2004 | Oka | 718/102 |
| 2005/0015471 A1* | 1/2005 | Zhang et al. | 709/221 |
| 2005/0022202 A1* | 1/2005 | Sannapa Reddy et al. | 718/105 |
| 2005/0050546 A1* | 3/2005 | Remany et al. | 718/105 |
| 2005/0055445 A1* | 3/2005 | Gupta et al. | 709/226 |
| 2005/0066014 A1* | 3/2005 | Willehadson et al. | 709/220 |
| 2005/0081211 A1* | 4/2005 | Koga et al. | 718/105 |
| 2006/0048161 A1* | 3/2006 | de Rose et al. | 718/105 |
| 2006/0069780 A1* | 3/2006 | Batni et al. | 709/226 |
| 2007/0041328 A1* | 2/2007 | Bell | 370/248 |

* cited by examiner

METHOD AND SYSTEM FOR LOAD BALANCING OF COMPUTING RESOURCES

RELATED APPLICATIONS

This application is a divisional of application Ser. No. 11/242,678, filed Oct. 3, 2005, now U.S. Pat. No. 7,934,216.

FIELD OF THE INVENTION

This invention relates to a method and system for balancing the load of tasks execution among system resources and in particular to a method and system for securing the configuration and data of a temporarily inactive computing system resource and then using that computing resource in a load balancing process to perform computing functions.

BACKGROUND OF THE INVENTION

The use of computing systems and computing network is a critical part of today's society. These systems, which comprise multiple computing related resources such as processors, storage facilities and countless interfaces that enable individuals to interact with these resources provide an essential tool for processing information and the transmission and receipt of information. A typical computing system has a distributed processing configuration. In this configuration, several processors positioned at various locations are connected to form the network. During operations, these processors perform the computing tasks of the system. Some tasks may require a combination of these processors to work in combination to accomplish the task.

As the reliance on computing systems continues to grow, in some instances, the amount of tasks placed on the computing system will require the system to operate at its maximum capacity. In addition, computer use patterns can cause a strain in computing resources at various times of day. Further, in some use patterns certain processors (servers) may have periods of heavy processor requests, while at that same time other processors may have only a minimal number of task requests. One response to this situation is to shift the processing of some requests to the processor server heavy traffic to the processor serving minimal traffic. This shift is known as 'load balancing'.

Loading balancing of a multi-site network during peak times requires an autonomic process of obtaining a snapshot of a current machine, installing a new image to the target with the necessary applications to serve requests needed to alleviate the load, and recasting the image back to the target once the load has been alleviated or an overriding policy is reached. Security permissions for casting an image, rebooting machines and storing images must also be addressed.

Load balancers are known solutions along with autonomic provisioning of systems given certain pools of available machines. Autonomic provisioning of systems within the network under no load situations (such as nights and weekends) meets SLA criteria with minimal traces of intrusion (except for a reboot). However, current solutions rely upon pooling rather than dynamic sensing of systems—and have no awareness of security policies in effect within the enterprise (or shared resource data center) other than through inference in the pooling of systems. With a premium on the use of computing resources within an organization, in most instances certain computing resources are inactive for a large portion of a 24-hour day. Many persons have personal computers that they use while working. After hours, these computes usually sit idle. This computing capability goes unused. The load balancing processes normally do not include devices as machines that are available to perform computing tasks. During normal hours of use, this approach is understandable. However, during normal periods of inactivity, these resources have the capability of performing computing tasks as part of load balancing system.

As mentioned, concept of load balancing of computing resources is not novel. U.S. Pat. No. 6,658,473 describes a method and apparatus for distributing load in a multiple server computer environment. In one embodiment, a group manager process on each server periodically determines the server's capacity and load (i.e., utilization) with respect to multiple resources. The capacity and load information is broadcast to the other servers in the group, so that each server has a global view of every server's capacity and current load. When a given terminal authenticates to a server to start or resume one or more sessions, the group manager process of that server first determines whether one of the servers in the group already is hosting a session for that user. If that is the case, one embodiment of the present invention redirects the desktop unit to that server and the load-balancing strategy is not employed. Otherwise, for each resource and server, the proper load balancing strategies are performed to identify which server is best able to handle that particular session. In U.S. Patent application 2004/0267920, describes an exemplary media implementation, in which one or more processor-accessible media include processor-executable instructions enables a system to facilitate actions including: operating network load balancing infrastructure in a first configuration; scaling out the network load balancing infrastructure; and operating the scaled-out network load balancing infrastructure in a second configuration. In another exemplary media implementation, one or more processor-accessible media include processor-executable instructions that, when executed, enable a system to be configured such that different percentages of system resources may be allocated to different network-load-balancing functions. In yet another exemplary media implementation, one or more processor-accessible media include processor-executable instructions for network load balancing that, when executed, enable a system to gradually increase a percentage of total computing resources that is devoted to the network load balancing. Other implementations are described herein Although there are load-balancing processes, there remains a need for a load balancing system that can incorporate machines that are temporarily inactive into the load balancing system. There further remains a need for a load balancing system that captures the configuration of this temporarily inactive machine and secures this configuration during the use of the machine in the load balancing activities and then restores this configuration at the completion of the activities such that none of the information of the primary is disturbed or compromised by the use of the machine in the load balancing activities.

SUMMARY OF THE INVENTION

It is an objective of the present invention to provide a load balancing method and system that incorporates temporarily inactive processing resources as part of the load balancing computing resources.

It is a second objective of the present invention to provide a method for capturing the existing configuration of a temporarily inactive processing resource prior to incorporation of that resource in the load balancing system.

It is a third objective of the present invention to provide a method for securing the existing configuration of a temporarily inactive processing resource prior to incorporation of that resource in the load balancing system.

It is a fourth objective of the present invention to prioritize the temporarily inactive processing resources such that the resources are used as part of the load balancing process in an order from the lowest priority to the highest priority.

It is a fifth objective of the present invention to provide a method monitors the capacity of the resources in the load balancing process and determines the distribution of task among the resources.

It is a sixth objective of the present invention to provide a method that detects the initiation or termination of a task and redistributes resources in response to the detected task initiation or task termination.

The present invention provides a method and system for load balancing of tasks on a computing system. This invention incorporates temporarily idled computing resources to perform computing tasks to alleviate the load on certain computing equipment and to have a more balanced processing load throughout the computing system.

The present invention provides the ability to take a snapshot of a system, securely store the image and re-image the system back to the original state. An auto discovery mechanism provides a list of machines that can be used as targets. A security server checks the policy for each potential system and prevents those with availability or security issues from being used by the provisioning system. The remaining machines after the auto discovery and security check is in a pool of target machines that can be imaged, used for load balance issues, and re-imaged when complete.

In the method of the invention, the initial step is to determine which temporarily inactive machines are available for use as part of the load balancing process. After this determination, the next step is to generate and store a snap shot of the current configuration of each resource. This snap shot contains the current status of the machine including all the data existing in the machine. From this snap shot, there is also a determination of the type security each machine must have to secure the unique information of that resource. The resources are prioritized to create an order of accessibility for use of the resources in the load balancing operations. The lowest priority machines would be the first temporary machines used to process tasks. At this point, the monitoring function of the load balancing process would be initiated and would monitor the processing loads on the various machines in the system. At a predefined completion time, the temporary processing resources would be taken out of the load balancing system. The next would be to restore to each machine the configuration of that machine prior to the inclusion of that machine in the load balancing system.

DETAILED DESCRIPTION OF THE INVENTION

The method of the present invention may be implemented in a distributed computer environment such as a local area network or a global computing environment. With reference now FIG. 1, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer possesses processing capabilities that can be used in load balancing applications. One or more such storage devices 25 may be utilized, to store the various data objects or documents, which may be periodically accessed and processed by a user within distributed data processing system 20.

Figure 1:
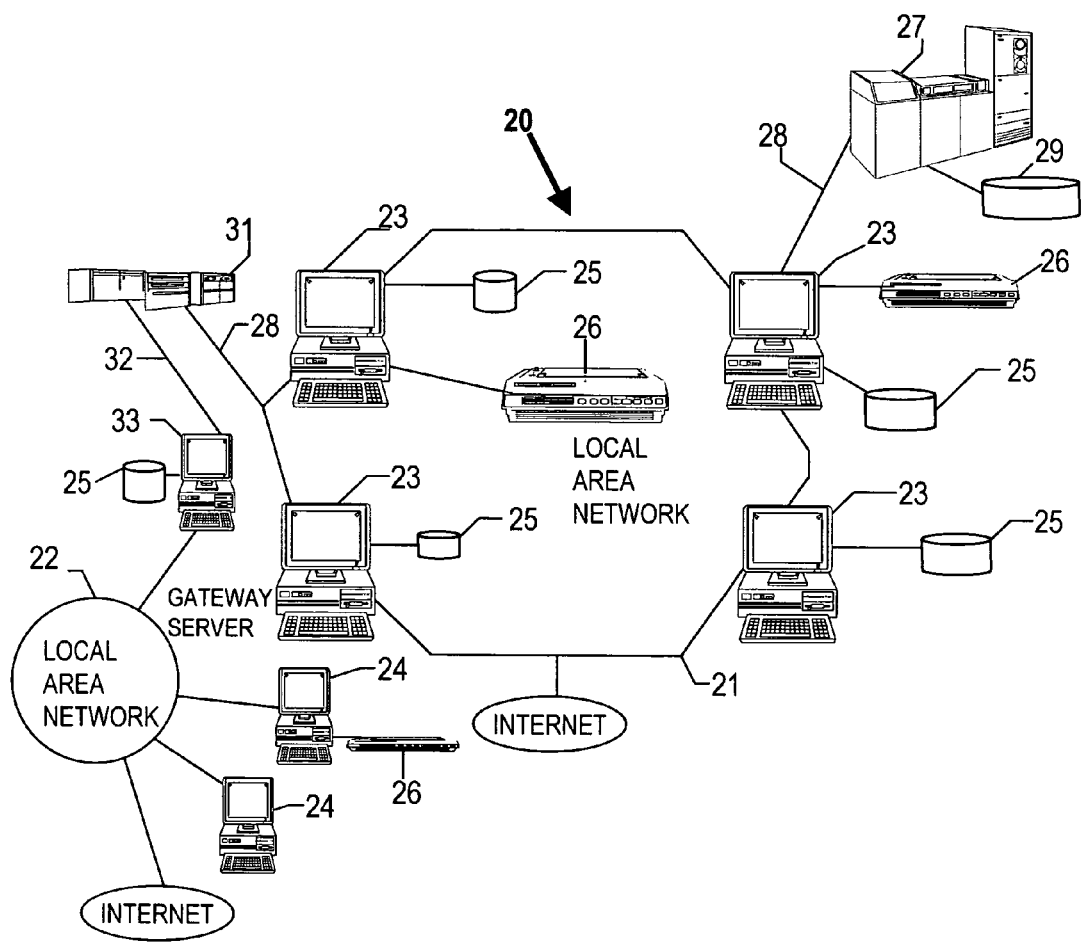
FIG. 1 is a view of a computing network configuration containing various computing resources that exist in a computer network.

Still referring to FIG. 1, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. The gateway server 33 is preferably an individual computer or Intelligent Work Station (IWS). These servers along with the mainframe computer 27 also serve as computing resources in the load balancing operations.

The method of the present invention uses computing resources that have primary computing tasks are not generally part of the load balancing function. The normal tasks of many of these resources are to meet the individual needs of one or more defined users. These users many include employees such as clerical personnel who use the computers during regular business hours of the organization. During the remainder of a 24-hour day (off hours) usually at night or weekends, these computing resources are idle. The present invention uses these computing during the time that they are inactive.

Figure 2:
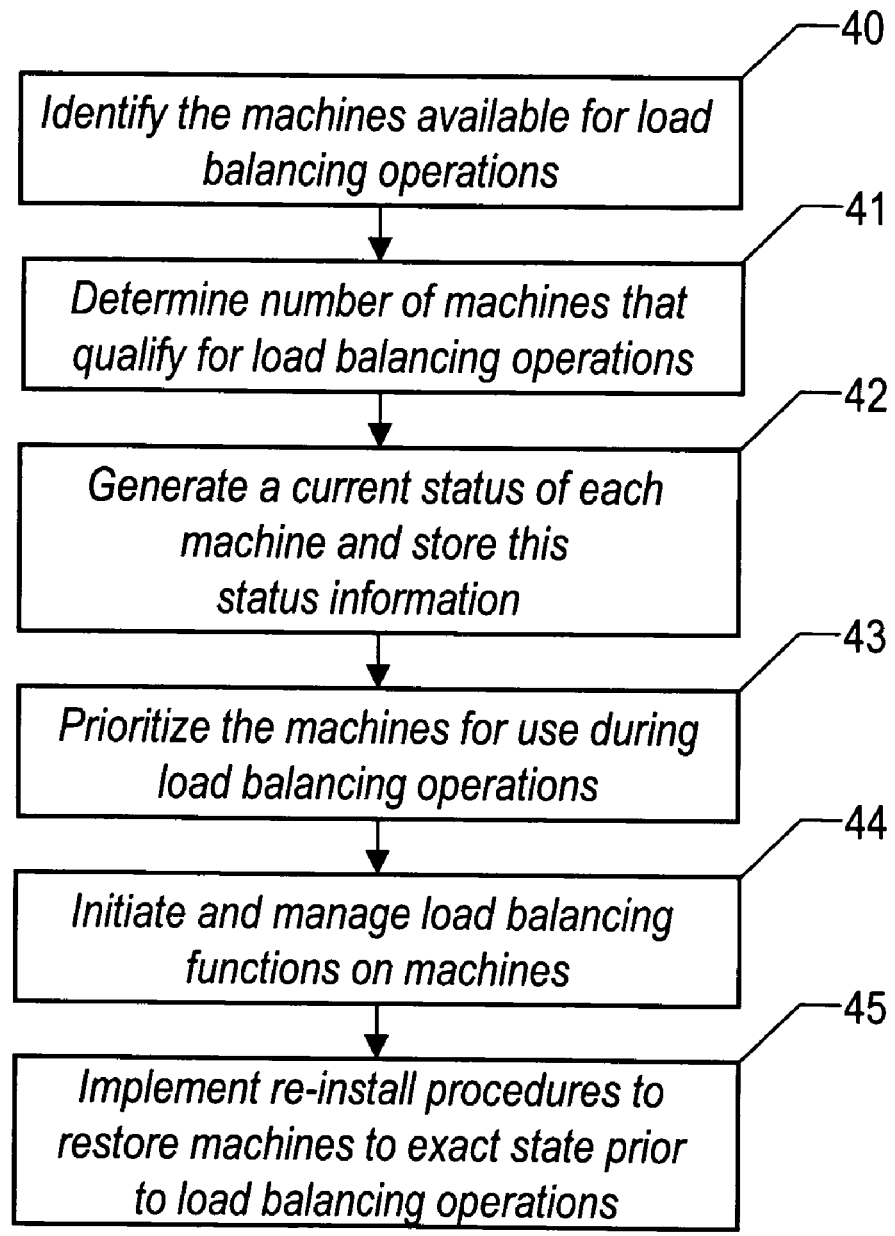
FIG. 2 is a flow diagram of the primary steps involved in the implementation of the method of the present invention.

Referring to FIG. 2, shown are the steps in the general implementation of the method of the present invention. The first step 40 is to identify the machines may be available for use in the load balancing operations. This step is a general identification based on a characterization of the computing resources in the system. Referring to FIG. 1, machines 27 (mainframe computer) and 33 (gateway server) are computing resources that probably already part of the load balancing operations. These types of machines are in constant use and would not need to part of this identification process. Machines 23 and 24 are personal computing resources. These types of machines are not in constant use and therefore, these machines would be identified for consideration in load balancing operations. At the completion of step 40, the list of available computing resources should include the types of devices indicated by machines 23 and 24.

Once there has been an identification of the available resources, step 41 determines which of resources qualify for use in load balancing operations. The qualification step is actually an extension of the step of the resource availability determination process. Although a machine may be described as a personal computing resource, it may not be desirable to use certain personal computing machine in load balancing operations. For example, some personal computers may not be inactive during nighttime hours. Second, a computer may not be inactive for an extended period of time. Third, the particular function of the machine or the particular type of work performed on the machine may preclude use of the machine in load balancing operations.

In step 41, the determination of machine availability can use criteria such as the length of time a computing resource will be available. The existence of a criterion could serve as a disqualifying factor for use of a resource. As mentioned, if there is history of periodic use of a computing machine during off hours, this use would most likely disqualify the machine as available for load balancing operations. Further, if a certain computer contained or processed data that is considered confidential, it may be desirable for security reasons to not have this machine available for load balancing operations. This security information could be detected during a security evaluation of each machine. In this determination action of step 41, each computing resource identified in step 40 would be evaluated to determine if any condition such as those listed above is present. If a disqualifying condition is present, that resource would be removed from the list of machines identified in step 40.

The qualifying machines determined in step 41 can be put into an available machines list as target machines. These machines will available for use in the load balancing operations. As a result of this load balancing use, it is necessary to secure the configurations and information on the computer resource. This process would involve the generation of a snap shot of the configuration of the machine. This snap shot is necessary in order to restore the computer to this configuration after completion of the load balancing operations. This snap shout would contain information about the hardware configuration of the machine and any and all software configurations as well as any data stored on the machine. All of this information can be backed up and saved as the machine image. After completion of the load balancing operations, the original stored computer image is reinstalled into the computer resource for use during normal business times.

Since the computer resources have different users and perform work with different data and applications, it may be desirable to prioritize the resources with regard to load balancing availability. For example, the machine of a clerical worker may contain less sensitive information than a computer for an engineer. Further, the clerical worker may be less likely to desire access to their computer resource during off peak times such as weekends. Although step 41 would classify both as available, the desire to prioritize their availability may still be desirable. Step 43 prioritizes the computer resources for use during the load balancing operations. For example, computing resources may be available from personnel, which include a clerk, secretary, engineer and executive secretary. The priority of these computing resources from lowest to highest may be clerk, secretary, engineer and executive secretary. With this priority, the first available resource for load balancing operations would be the clerk resource followed by the secretary resource, then the engineer and executive secretary.

Step 44 initiates the monitoring feature of the load balancing method of the present invention. In this state, the monitoring function detects request to initiate tasks using load-balancing resources. In this step, the monitor determines which computer resource will be used to perform the task functions. In addition, the monitor function manages the computing load on the available resources in order the keep a proper balance of tasks executing on the available computer resources. The monitor also detects the termination of a task and can redistribute the computing load in view of a terminated task.

At the completion of the load balancing function, step 45 reinstalls the original configurations for each computer that was available for load balancing operations. The completion of this load balancing operation can be based on predetermined parameters. For example, the completion of the load balancing function could be six (6) AM. Therefore at 6 am, the method would initiate re-install procedure to install the original computer configurations to the computing resources.

Figure 3:
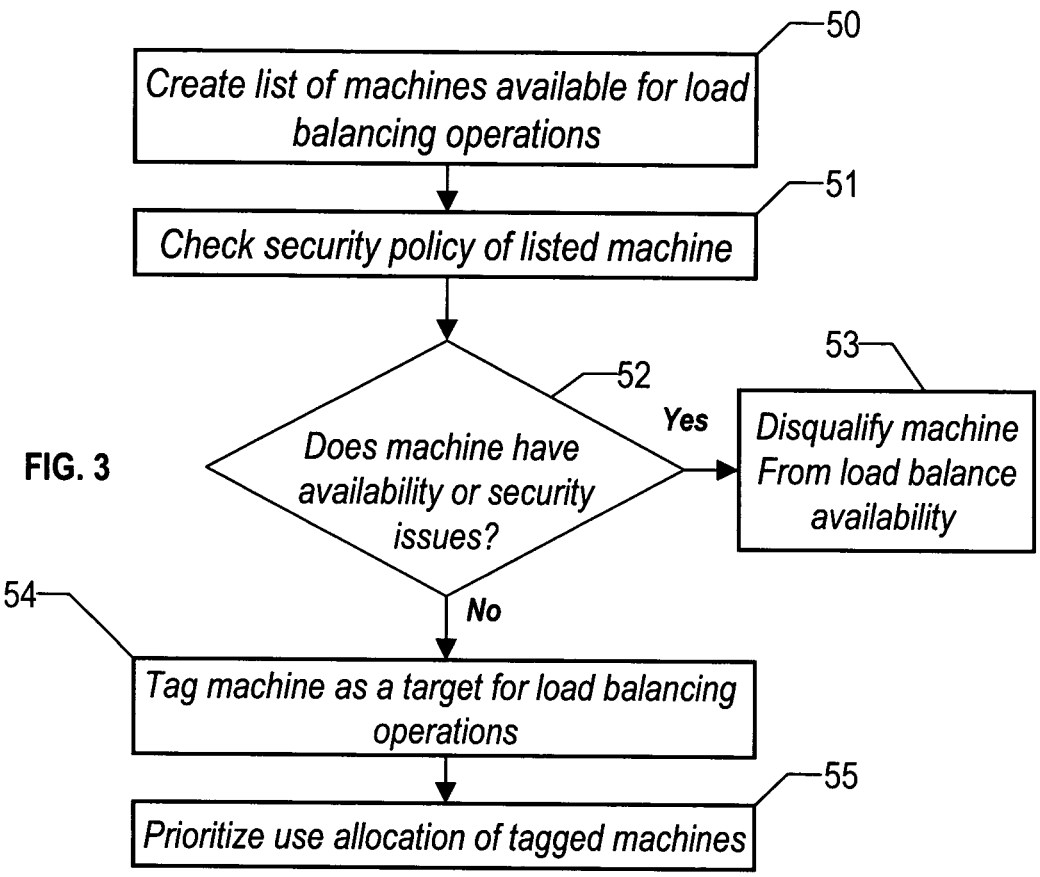
FIG. 3 is a flow diagram of the steps involved in determining the temporarily inactive resources that are available for incorporation into the load balancing operations.
Figure 4:
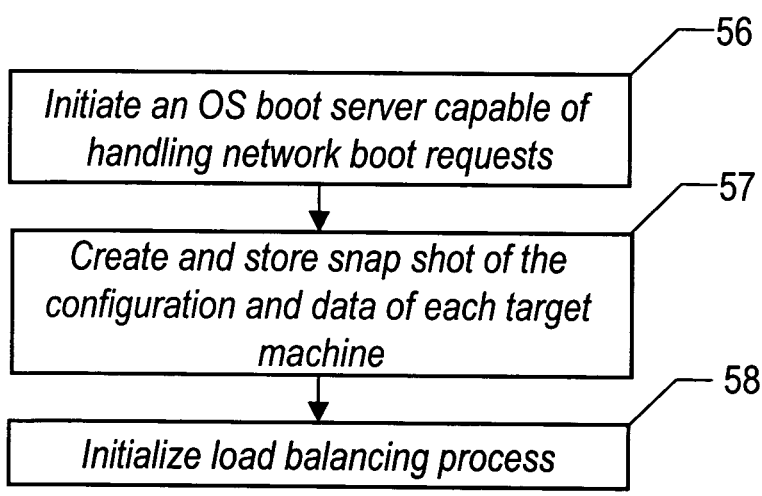
FIG. 4 is a flow diagram of the steps involved in capturing and securing the configuration and information of the temporarily available resource used in the load balancing operations.

FIG. 3 is a flow diagram of the steps involved in determining the temporarily inactive resources that are available for incorporation into the load balancing operations. As in FIG. 2, the initial step 50 creates the list of computing resources that may be available for load balancing operations. As mentioned, these computing resources perform various functions. Step 51 performs a security policy check of each machine to determine if the type of information on that machine and the tasks performed by that machine are sensitive to the point that it is undesirable to make this machine available for load balancing operations. To perform this security check, there can be criteria, which can used to determine the security status of each machine. Step 52 evaluates results of this security check of step 51 and determines whether a computer machine has security concerns. If the computer machine has security issues, the machine is disqualified for use in load balancing operations in step 53. In addition to security concerns, step 52 also evaluates the availability of computing resources. Some computing resources may not have security issues but may not be idle for a sufficient period of time. As mentioned, some personnel may randomly use the computer resources during off hours. This random use may be frequent enough that the computer resource is viewed as not having a sufficient idle time for load balancing operations. The idle time can be determined by tracking the logon time of the computer. If the resource does not have sufficient idle time, the resource is disqualified in step 53. In step 52, a computer resource can be disqualified for either security issues or lack a sufficient idle time. If neither the computer security nor idle time is a concern, the computer resource is tagged as a target resource for load balancing operations in step 54. Step 55 performs the prioritizing functions as previously mentioned for the computer resource that qualify for load balancing operations FIG. 4 is a flow diagram of the steps involved in capturing and securing the configuration and information of the temporarily available computer resource used in the load balancing operations. At this point, step 56 performs the initialization of an OS boot server that is capable of handling network boot requests. This server will house the monitoring program for the load balancing operations. In an alternate embodiment, this OS boot server initialization can occur prior to step 50 of FIG. 3. Step 57 creates a snap shot of the system configuration and data in each target machine as determined in steps 52 and 54. At this point, the preliminary procedures for gathering the computing resource are complete. Step 58 initiates the load balancing process using the targeted computing resources.

Figure 5:
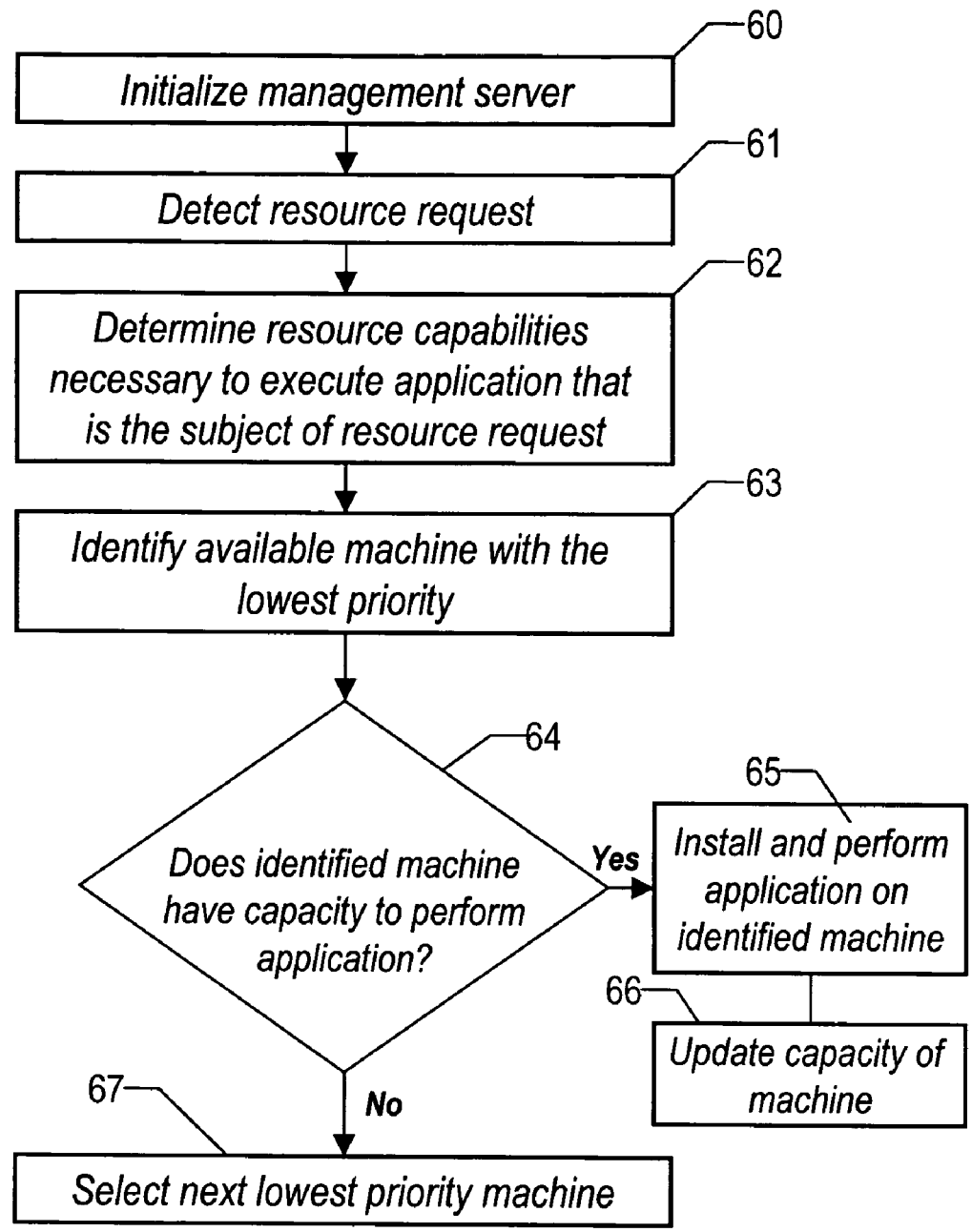
FIG. 5 is a flow diagram of the detailed steps in an implementation of the load balancing method of the present invention.

FIG. 5 is a flow diagram of the detailed steps in an implementation of the load balancing method of the present invention. Now that there has been an identification of available load balancing machines, the establishment of the load balancing computing resources is complete and the system is ready to perform the load balancing functions as needed. There can be various approaches to implementing the load balancing function of the present invention. One approach can be a stand-by approach. In this approach, when the load capacity of the original load balancing system exceeds a predefined point, such as 90 percent capacity, the additional computing machines identified herein become available for load balancing operations. The additional computing machines would be incorporated as load balancing need dictate. In another approach, the identified computing machines can be immediately incorporated into the load balancing system at a predefined point (off hours) without need to monitor the capacity of an initial set of machines in a system.

Referring to FIG. 5, step 60 performs an initialization of the management server, which provides the monitoring, and managing of the load balancing function. After initialization, the process is in a monitoring stage. In this stage, the process tracks the number of tasks executing at all times and the load distribution of these tasks. During the monitoring process, requests are made for computing resources. These requests occur at any time during the execution of tasks. Step 61 can detect these requests for all computing resources in the load balancing system. If the computing load is such that it is necessary to use the personal computing resources identified for load balancing operations, step 62 identifies the application for which the resource request was made and determines the resource capabilities necessary to execute the application. Step 63 then identifies an available computing resource lowest priority. However, this identified resource may already have executing programs. As a result, step 64 determines whether that identified resource has the capacity to execute the requested task. Depending on the configuration of the system, it may be possible to use multiple computing resources to execute the task. If the identified computing resource does have enough capacity to execute the task, step 65 installs the application on the identified resource for execution. The computing capacity of that machine is then updated in step 66 to reflect the executing of the task. If the identified machine does not have sufficient capacity to execute the task, step 67 selects the next available computing machine with the lowest priority. At this point, the process returns to step 64. An optional step between steps 64 and 67 would be to establish a maximum capacity for which a computing would operate and designate a computing machine that had reached that capacity as non-available. This designation would eliminate the need for step 64 in some cases. When a task on a non-available computer finishes or terminates and the computing capacity on that computer is reduced, the computer would be designated as available.

Figure 6:
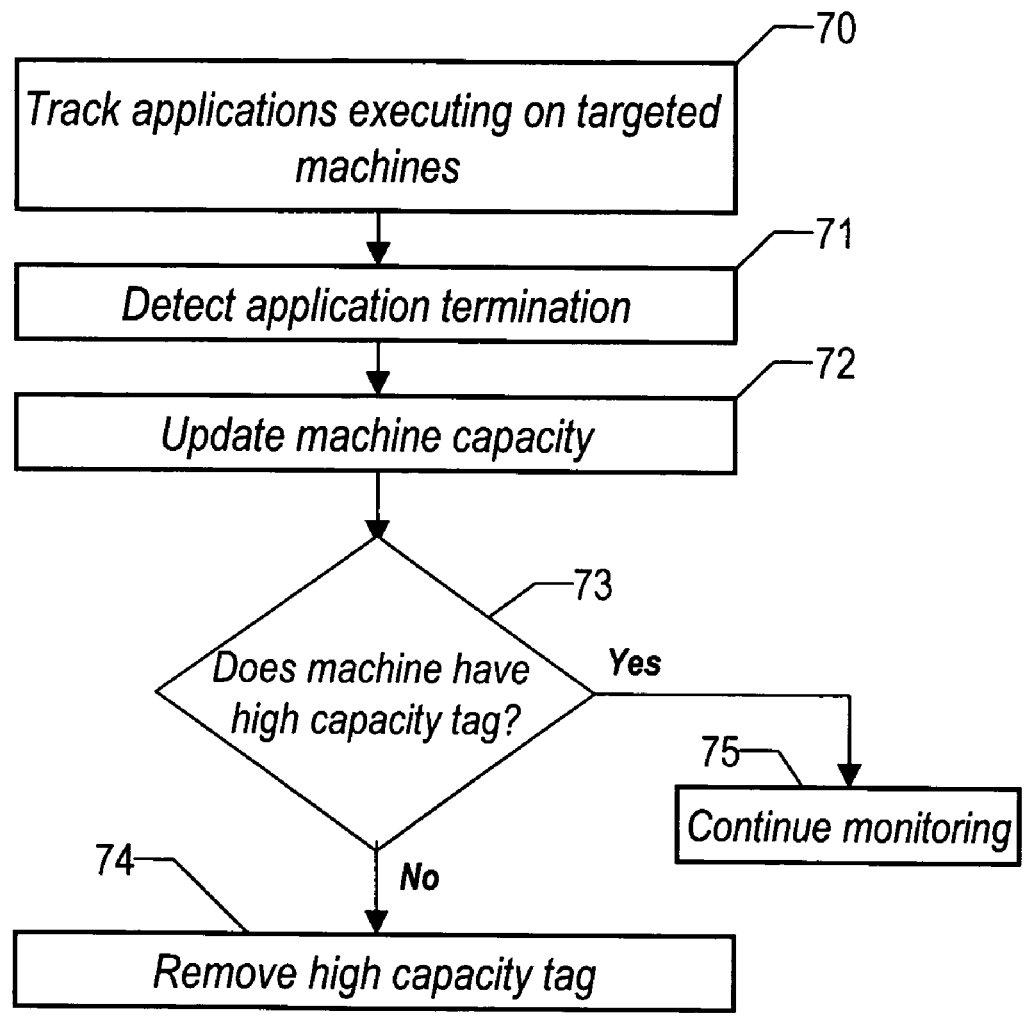
FIG. 6 is a flow diagram of the steps involved in the response to the termination of a task executing under the load balancing operations of the present invention.

FIG. 6 is a flow diagram of the steps involved in the response to the termination of a task executing under the load balancing operations of the present invention. As with the other methods, step 70 tracks the applications executing on the computing resources. When a task terminates or completes execution on a machine, step 71 detects this termination. At this point, step 72 updates the computing capacity on that machine. Step 73 then makes a determination of whether that machine's capacity is below the high capacity threshold such that the machine can be considered available to execute additional tasks. This step is helpful because the termination of a task may still leave the computing machine in a high capacity state. If the computer capacity is below the high capacity threshold, step 74 removes the high threshold tag, which makes the computer available to execute additional tasks. If the computing capacity is still. above the high threshold, the high tag remains on the computer and the monitoring of the system continues in step 75.

In another approach to the use of temporarily inactive computing machines, the targeted machines can be used separately to perform certain batch processing tasks. In this approach, these targeted resources would perform the processing using the priority selection process as described. This form of load balancing would relieve the other computing resources of the task of processing batch tasks and online real-time tasks on the same computing resources.

At the completion of the off hours session, the temporarily inactive computing resources that were identified specifically for load balancing operations are reconfigured to their original configuration before the load balancing activities. The concept of this invention and approach utilities these inactive resources to produce a more efficient and reliable system for executing tasks.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs.

We claim:

1. A method for load balancing of computing tasks in a computing system using temporarily inactive computing machines in the performance of the computing tasks and comprising the steps of:

identifying the temporarily inactive computing machines that may be available for load balancing operations;

determining which of the temporarily inactive computing machines quality for load balancing operations, by determining an amount of continuous time each temporarily inactive computing machine will be inactive; and determining a security level of each temporarily inactive computing machine, the security level being based on a sensitivity level of computing tasks performed on each temporarily inactive computing machine, a sensitivity level of data stored on each temporarily inactive computing machine and the function of a user of each temporarily inactive computing machine;

securing the current configuration of each temporarily inactive computing machine that qualifies for the load balancing operations;

prioritizing the qualifying computing machines for use during the load balancing operations;

managing a computing load of the prioritized computing machines on the computing system and assigning the computing tasks to the prioritized computing machines as part of the load balancing operations; and installing the secured current configuration for each prioritized computing machine at the completion of the load balancing operations.

2. The method as described in claim 1 wherein said prioritizing step further comprises:

determining the priority level of a computing machine based on the level of a user having access to that computing machine users; and assigning the determined priority level to the computing machine.

3. The method as described in claim 1 wherein said determining which computing machines qualify for load balancing operations step further comprises:

determining whether a particular computing machine has a security level in a predetermined range for the computing machine to be used in the load balancing operations; and disqualifying a computing machine with a security level not in the range for use in the load balancing operations.

4. The method as described in claim 3 further comprising the step of tagging a temporarily inactive computing machine as available for use during the load balancing operations.

5. The method as described in claim 1 further comprising before the performance of the load balancing operations, the step of determining a maximum load capacity for a computing machine in the load balancing operations.

6. The method as described in claim 5 wherein said managing step further comprises the steps of:

detecting a request for a computing machine;

determining the resource capabilities necessary to execute a computing task that is the subject of the request;

identifying an available computing machine having the lowest priority; and installing the task on that computing machine for execution.

7. The method as described in claim 6 further comprising the step of updating a capacity status of the computing machine in which the task was installed for execution to reflect the new load on that particular computing machine.

8. The method as described in claim 6 wherein said identifying step further comprises the step of determining whether a computing machine has a sufficient amount of continuous time to perform the requested task.

9. The method as described in claim 1 further comprising before said managing step, the step of configuring each temporarily inactive computing machine for use in the load balancing operations.

10. The method as described in claim 1 wherein said identifying step further comprises identifying all computing machines of the computing system that are available for the load balancing operations and wherein said determination of which computing machines qualify for load balancing operations further comprises determining which of all identified computing machines qualify for the load balancing operations.

11. The method as described in claim 1 wherein said managing step further comprises the steps of:

detecting a request for a computing machine;

determining the resource capabilities necessary to execute a computing task that is the subject of the request;

determining the order of use of all available computing machines as needed to perform the load balancing operations.

12. A system for load balancing of computing tasks in a computing system using temporarily inactive computing devices in the performance of the computing tasks comprising:

primary computing devices initially designated for load balancing operations;

secondary computing devices determined to qualify for the load balancing operations by determining an amount of continuous time each secondary computing device will be inactive;

determining a security level of each secondary computing device, the security level being based on a sensitivity level of computing tasks performed on each secondary computing device, a sensitivity level of data stored on each secondary computing device and the function of a user of each secondary computing device;

a software module for determining the availability of a computing device as a secondary computing device;

a storage device for storing the status of every computing device;

a software program for processing said primary and secondary computing devices used in the load balancing operations;

a software module for prioritizing the secondary computing devices;

a software module for securing and storing the current configuration of each secondary computing device;

a software module for installing the secured and stored current configuration of each secondary device;

a module for monitoring the load of the computing system;

a module for determining the availability of a computing device as a secondary computing device to execute a task and assigning the task to the secondary computing device to execute the task; and a software program for balancing a computer load between the primary and secondary computing devices.

13. The system as described in claim 12 further comprising a system resource for determining which computing device is used first according to the need of the system for load balancing.

14. A computer system program product stored in a non-transitory computer readable storage medium for load balancing of computing tasks in a computing system using temporarily inactive computing machines in the performance of the computing tasks and comprising instructions for:

identifying the temporarily inactive computing machines that may be available for load balancing operations;

determining which of the temporarily inactive computing machines qualify for the load balancing operations, by determining an amount of continuous time each temporarily inactive computing machine will be inactive;

determining a security level of each temporarily inactive computing machine, the security level being based on a sensitivity level of tasks performed on each temporarily inactive computing machine, a sensitivity level of data stored on each temporarily inactive computing machine and the function of a user of each temporarily inactive computing machine;

securing a current configuration of each temporarily inactive computing machine that qualifies for the load balancing operations;

prioritizing the qualifying computing machines for use during the load balancing operations;

managing the load of the prioritized computing machines on the computing system and assigning tasks to the prioritized computing machines as part of the load balancing operations; and installing the secured current configuration for each prioritized computing machine at the completion of the load balancing operations.

15. The computer system program as described in claim 14 wherein said prioritizing instructions further comprise instructions for:

determining the priority level of a computing machine based on the level of a user having access to that computing machine users; and assigning the determined priority level to the computing device.

16. The computer system program as described in claim 14 wherein said managing step further comprises the steps of:

detecting a request for a computing machine;

determining the resource capabilities necessary to execute a computing task that is the subject of the request;

identifying an available computing machine having the lowest priority; and installing the computing task on that computing machine for execution.

\* \* \* \* \*